United States Patent
Rao et al.

(10) Patent No.: US 11,194,377 B2
(45) Date of Patent: Dec. 7, 2021

(54) SYSTEM AND METHOD FOR OPTIMIZING HARDWARE RESOURCES FOR OPTIMAL WORKLOAD PERFORMANCE

(71) Applicant: DELL PRODUCTS, LP, Round Rock, TX (US)

(72) Inventors: Balaji Bapu Gururaja Rao, Austin, TX (US); Elie Antoun Jreij, Pflugerville, TX (US); John Erven Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 16/748,164

(22) Filed: Jan. 21, 2020

(65) Prior Publication Data

US 2021/0223848 A1    Jul. 22, 2021

(51) Int. Cl.
| | |
|---|---|
| *G06F 1/26* | (2006.01) |
| *G06F 1/3225* | (2019.01) |
| *G06T 1/20* | (2006.01) |
| *G06F 1/3234* | (2019.01) |
| *G06F 1/3296* | (2019.01) |
| *G06F 1/3203* | (2019.01) |

(52) U.S. Cl.
CPC .......... *G06F 1/3225* (2013.01); *G06F 1/3275* (2013.01); *G06F 1/3296* (2013.01); *G06T 1/20* (2013.01); *G06F 1/3203* (2013.01)

(58) Field of Classification Search
CPC .... G06F 1/3225; G06F 1/3275; G06F 1/3296; G06T 1/20
USPC ......................................................... 713/320
See application file for complete search history.

(56) References Cited

U.S. PATENT DOCUMENTS

| | | | |
|---|---|---|---|
| 9,250,665 B2 | 2/2016 | Avkarogullari et al. | |
| 2009/0109230 A1* | 4/2009 | Miller | G06F 15/16 345/506 |
| 2011/0055596 A1 | 3/2011 | Wyatt | |
| 2011/0185356 A1* | 7/2011 | Shetty | G06F 9/5077 718/1 |
| 2012/0179938 A1* | 7/2012 | Nijhawan | G06F 1/3206 714/47.2 |
| 2014/0068627 A1* | 3/2014 | Goh | G06F 1/329 718/105 |
| 2014/0100706 A1* | 4/2014 | Khatri | G06F 1/3265 700/297 |

(Continued)

*Primary Examiner* — Volvick Derose
(74) *Attorney, Agent, or Firm* — Larson Newman, LLP

(57) ABSTRACT

An information handling system includes a processor, a graphics processing unit (GPU), and a baseboard management controller (BMC). The BMC includes a power ratio table with a plurality of entries, each correlating a workload with a power ratio of a power level of the processor when the particular workload is instantiated on the information handling system to a power level of the GPU when the particular workload is instantiated on the information handling system. The BMC determines that the power ratio table includes an entry associated with a workload instantiated on the information handling system, determines that a total power level of the information handling system is greater than a power level threshold, and throttles a power level of the processor and a power level of the GPU based upon a power ratio of the entry in response to determining that the total power level is greater than the power level threshold.

20 Claims, 3 Drawing Sheets

(56) References Cited

U.S. PATENT DOCUMENTS

| | | | |
|---|---|---|---|
| 2015/0143142 A1* | 5/2015 | Park | G06F 1/206 713/320 |
| 2015/0241946 A1* | 8/2015 | Allen-Ware | G06F 1/3206 713/320 |
| 2015/0317762 A1* | 11/2015 | Park | G06F 1/3206 345/505 |
| 2015/0355692 A1* | 12/2015 | Paul | G06F 1/3206 713/322 |
| 2016/0179164 A1* | 6/2016 | Park | G06F 1/3243 713/322 |
| 2016/0291676 A1* | 10/2016 | Akimoto | G06F 1/3234 |
| 2017/0061568 A1* | 3/2017 | Metz | G06T 1/20 |
| 2019/0370086 A1* | 12/2019 | Heilper | G06N 3/063 |
| 2019/0377395 A1* | 12/2019 | Kaburlasos | G06F 1/3206 |

* cited by examiner

SYSTEM AND METHOD FOR OPTIMIZING HARDWARE RESOURCES FOR OPTIMAL WORKLOAD PERFORMANCE

FIELD OF THE DISCLOSURE

This disclosure generally relates to information handling systems, and more particularly relates to optimizing hardware resources for optimal workload performance in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, a graphics processing unit (GPU), and a baseboard management controller (BMC). The BMC may include a power ratio table with a plurality of entries, each correlating a workload with a power ratio of a power level of the processor when the particular workload is instantiated on the information handing system to a power level of the GPU when the particular workload is instantiated on the information handling system. The BMC may determine that the power ratio table includes an entry associated with a workload instantiated on the information handling system, determine that a total power level of the information handling system is greater than a power level threshold, and throttle a power level of the processor and a power level of the GPU based upon a power ratio of the entry in response to determining that the total power level is greater than the power level threshold.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
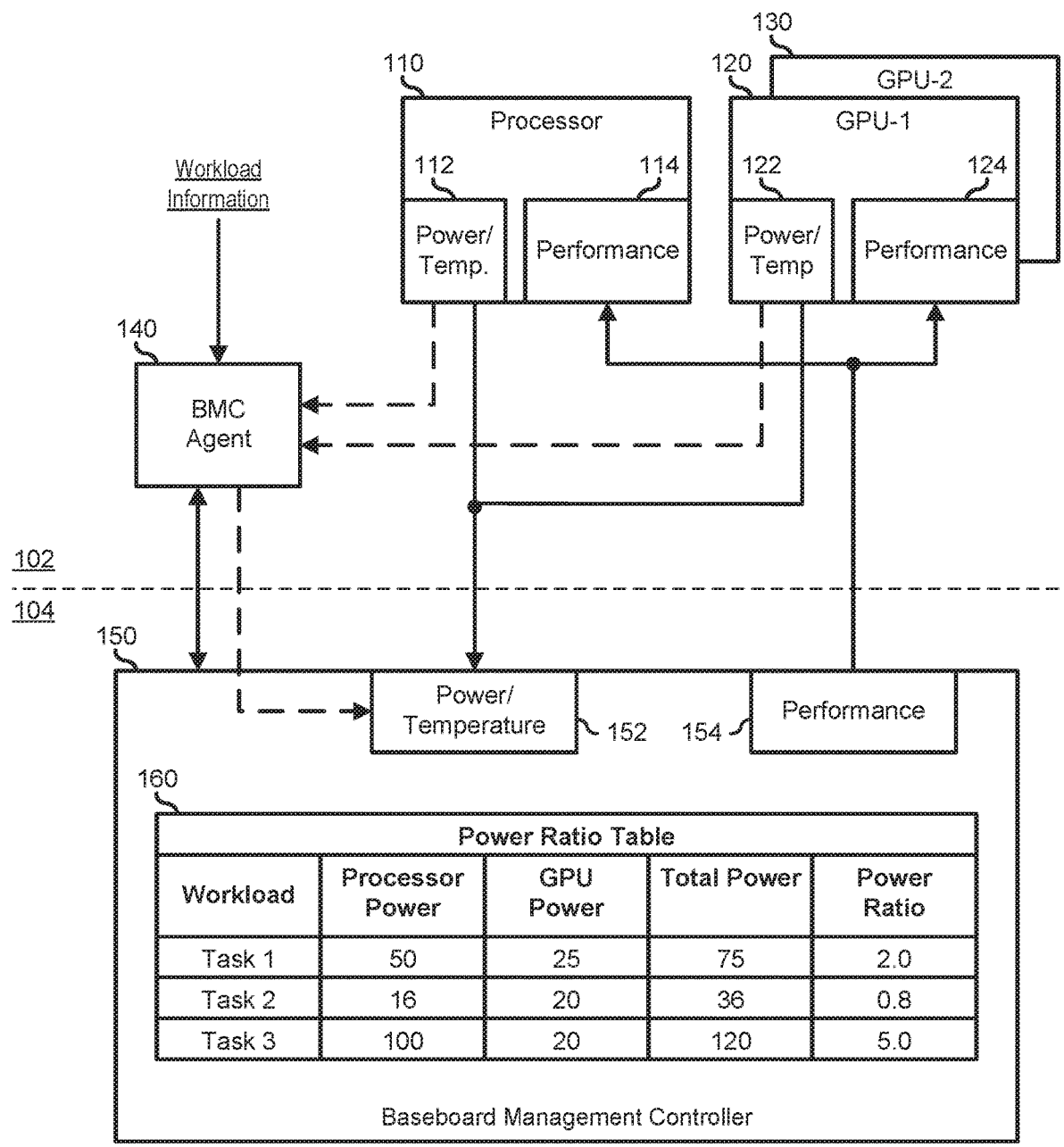
FIG. 1 is a block diagram illustrating an information handling system according to an embodiment of the present disclosure.

FIG. 1 illustrates an information handling system 100, including a host processing system 102 and a management system 104. Host processing system 102 represents hardware, firmware, and software components that are typically associated with a computer or other information handing system, and includes a processor 110, graphics processing units (GPUs) 120 and 130, and a baseboard management controller (BMC) agent 140. Processor 110 represents one or more central processing units (CPUs), processor cores, or other processing devices. Processor 110 may also be understood to represent other devices typical of an information handling system such as information handling system 100, and that are utilized to perform the processing tasks of the information handling system, such as initializing and configuring the information handling system under a basic input/output system (BIOS) or a Universal Extensible Firmware Interface (UEFI), loading and executing an operating system (OS), and loading and executing applications programs, software, utilities, and the like. As such, processor 110 may be understood to include memory devices such as read-only memory (ROM) devices, random access memory (RAM) devices, FLASH memory devices, and the like, data storage devices such as disk drives, solid-state drives (SSDs), and the like, input/output (I/O) devices such as network interface devices, storage interface devices, and the like, human interface devices such as a keyboard, a mouse, a display device, and the like.

GPUs 120 and 130 represent processing resources of information handling system 100 that can be utilized to offload processor 110 from various functions as needed or desired. As such, GPUs 120 and 130 may be utilized to accelerate applications running on processor 110 by offloading compute-intensive and time consuming tasks from the processor. In particular, GPUs 120 and 130 typically perform parallel processing tasks on data much faster than similar code-based operations performed by processor 110.

Processor 110 includes a power/temperature monitor module 112 (henceforth power monitor 112). Power monitor 112 operates to provide information related to one or more of the power level or the temperature at which processor 110 is operating at a given moment. Power level information can be provided in terms of an amount of power being consumed by processor 110, as a percentage of a rated maximum power level of the processor, or as another type of information as may be used to determine a power level at which the processor is operating, as needed or desired. Temperature information can be provided in terms of an absolute temperature of one or more location of processor 110, as a percentage of a rated maximum operating temperature, as a number of degrees plus or minus that the operating temperature is from the rated maximum operating temperature, or as another type of information as may be used to determine a temperature level at which the processor is operating, as needed or desired.

GPU 120 includes a power/temperature monitor module 122 (henceforth power monitor 122). Power monitor 122 operates to provide information related to one or more of the power level or the temperature at which GPU 120 is operating at a given moment. Power level information can be provided in terms of an amount of power being consumed by GPU 120, as a percentage of a rated maximum power level of the GPU, or as another type of information as may be used to determine a power level at which the GPU is operating, as needed or desired. Temperature information can be provided in terms of an absolute temperature of one or more location of GPU 120, as a percentage of a rated maximum operating temperature, as a number of degrees plus or minus that the operating temperature is from the rated maximum operating temperature, or as another type of information as may be used to determine a temperature level at which the GPU is operating, as needed or desired. In a particular embodiment, the power and temperature information from power monitors 112 and 122 are provided to BMC agent 140, and the BMC agent forwards the power and temperature information to BMC 150. In another embodiment, the power and temperature information from power monitors 112 and 122 are provided to a power/temperature monitor module 152 (henceforth power monitor 152) of BMC 150, as described further below. GPU 130 includes similar functions and features to GPU 120, and the capabilities and methods described herein with respect to GPU 120 will be understood to be applicable to GPU 130. As such, GPUs 120 and 130 may be of a common make or model, or may be of different makes and models, but that implement to common functions and features as described herein.

Processor 110 includes a performance control module 114 (henceforth performance control 114). Performance control 114 operates to receive performance information that directs processor 110 to operate at a performance level as indicated by the performance information. The performance information can be received in terms of a power level at which processor 110 is to be operated, as a percentage of a maximum operating performance level of the processor, as a direction to throttle or otherwise disable particular operating portions of the processor, or as another type of information as may be used to set a performance level at which the processor is to operate, as needed or desired. GPU 120 includes a performance control module 124 (henceforth performance control 124). Performance control 124 operates to receive performance information that directs GPU 120 to operate at a performance level as indicated by the performance information. The performance information can be received in terms of a power level at which GPU 120 is to be operated, as a percentage of a maximum operating performance level of the GPU, as a direction to throttle or otherwise disable particular operating portions of the GPU, or as another type of information as may be used to set a performance level at which the GPU is to operate, as needed or desired. In a particular embodiment, the performance information is provided to performance controls 114 and 124 are received from a performance control module 154 (henceforth performance control 154) of BMC 150, as described further below.

Management system 104 represents one or more processing devices, such as a dedicated BMC System-on-a-Chip (SoC) device, one or more associated memory devices, one or more network interface devices, a complex programmable logic device (CPLD), and the like, that operate together to provide a management environment for information handling system 100. Management system 104 includes a BMC 150, and is connected to various components of host processing system 102 via various internal communication interfaces to provide an out-of-band (OOB) mechanism to retrieve information related to the operation of the host processing system, to provide BIOS/UEFI or system firmware updates, to manage non-processing components of information handling system 100, such as system cooling fans and power supplies. For example, BMC 150 can be connected to host one or more elements of host processing system 102 via a Low Pin Count (LPC) interface, an Inter-Integrated-Circuit (I2C) interface, an I3C interface, a PCIe interface, or the like. An example of BMC 150 may include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management system 104 may include additional memory devices, logic devices, security devices, or the like, as needed or desired.

BMC 150 operates to receive the power and temperature information either from power monitors 112 and 122, and from other elements of information handling system 100 directly, or from BMC agent 140. BMC 150 further operates to manage the operations and performance levels of processor 110, GPU 120, and the other elements of the information handling system. BMC 150 operates to manage the operations and performance levels within information handling system 100 based upon various operational considerations and parameters, as needed or desired. For example, BMC 150 may operate to limit the operating temperature of information handling system 100, overall, or of one or more elements of the information handling system, or the BMC may operate to limit the power consumption of the overall information handling system or of one or more elements of the information handling system, as needed or desired. Further, BMC 150 operates to manage the operations and performance levels within information handling system 100 via various control mechanisms, as needed or desired. For example, when BMC 150 is operating to limit the operating temperature of information handling system 100, the BMC may direct one or more system fan within the information handling system to increase its operating speed in order to remove a greater amount of heat from the information handling system, or the BMC may reduce the performance level of one or more of the elements of the information handling system in order to reduce the amount of heat generated by the within the information handling system. on the other hand, when BMC 150 is operating to limit the power consumption of information handling system 100, the BMC may direct the fans to decrease their operating speeds, insofar as the fan speeds can be reduced without increasing the temperatures within the information handing system beyond various thermal limits for the information handling system. Additionally, BMC 150 can operate to reduce the performance level of one or more of the elements of the information handling system in order to reduce the amount of power consumed by the information handling system, as needed or desired.

It has been understood by the inventors of the present disclosure that traditional power capping algorithms have been focused upon processors and memory sub-systems of an information handling system as providing large power savings. However, such savings need to be balanced with the resulting loss of performance when the processors and memory subsystems are power capped. Moreover, as the number of GPUs in an information handling system is increasing, and the overall power consumed by the GPUs is increasing, not only a total value, but also as a proportion of the whole, it is understood that simply power capping processors and memory subsystems may not provide sufficient power savings if the GPUs are not capped as well. However, providing power capping to the processors, memory subsystems, and GPUs uniformly may result in greater performance losses, particularly because the share of power consumed by the GPUs may be dependent upon the workload that is being executed.

In a particular embodiment, BMC 150 operates to proportionally throttle processor 110 and GPU 120 based upon a known ratio of the power consumed by the processor to the power consumed by the GPU for a particular workload that is being executed. To this end, BMC 150 includes a power ratio table 160 that correlates a workload being executed by host processing system 102 to a known power level consumed by processor 110 when executing that workload, and to a known power level consumed by GPU 120 when executing that workload. For each known workload and power level correlation, BMC 150 determines a total power consumed by processor 110 and GPU 120, and calculates a ratio between the power consumed by the processor and the power consumed by the GPU. For example, when host processing system 102 is executing a first workload, "Task 1," BMC 150 accesses power ratio table 160 to determine that processor 110 is consuming 50 Watts (W) and that GPU 120 is consuming 25 W, resulting in a total of 75 W consumed, and the BMC determines that the ratio between the power consumed by the processor and the power consumed by the GPU is 2.0. Similarly, when host processing system 102 is executing a second workload, "Task 2," BMC 150 accesses power ratio table 160 to determine that processor 110 is consuming 16 W and that GPU 120 is consuming 20 W, resulting in a total of 365 W consumed, and the BMC determines that the ratio between the power consumed by the processor and the power consumed by the GPU is 0.8, and when the host processing system is executing a third workload, "Task 3," the BMC accesses the power ratio table to determine that the processor is consuming 100 W and that the GPU is consuming 20 W, resulting in a total of 120 W consumed, and the BMC determines that the ratio between the power consumed by the processor and the power consumed by the GPU is 5.0.

During run time operation, BMC agent 140 operates to communicate information related to which workloads are being executed on host system. BMC agent 140 represents hardware and software that provides a communication link between host processing system 102 and management system 104, and may include a BMC service module such as a Dell iDRAC Service Module (ISM) or the like. Here, BMC agent 140 communicates with a hosted operating system or hypervisor instantiated in host processing system 102 to receive workload information. In particular, the workload information can include a workload identifier, such as a workload name, and information that identifies which GPU the workload is being run on.

When BMC 150 receives the workload information, the BMC determines the power being utilized to run the workload based upon the information in power ratio table 160. For example, if the workload information indicates that "Task 1" is being executed in host processing system 102, then the BMC can determine that processor 110 is consuming 50 W and that GPU 120 is consuming 25 W, that "Task 1" is thus consuming 75 W, and that the power ratio is 2.0. Here, when information handling system 100 is operating in a power capping mode, where the total power consumed by the information handling system is to be capped at a particular maximum power level, then BMC 150 operates to adjust the performance levels of processor 110 and of GPU 120 in accordance with the power ratio for "Task 1." Thus, when the power consumed by information handling system 100 exceeds a particular threshold, then BMC 150 operates to reduce the power consumed by processor 110 and GPU 120 in accordance with the power ratio for "Task 1." For example, if the power level of information handling system 100 needs to be reduced by 15 W, then, based upon power ratio table 160, BMC 150 can operate to reduce the performance level of processor 110 at twice the rate of the reduction in the performance level of GPU 120. That is, BMC 150 operates to provide performance level signals from performance module 154 to performance modules 114 and 124 that direct processor 110 to shed 10 W less power, e.g., by reducing the performance level of the processor, and direct GPU 120 to shed 5 W.

In the particular case where GPU 120 and GPU 130 are of a common make and model, it will be understood that power ratio table 160 will include common information to correlate the various tasks with the total power and power ratio for each task. On the other hand, when GPU 120 and GPU 130 are of differing makes or models, it will be understood that BMC 130 will include a separate power ratio table for GPU 130 similar to power ratio table 160, or that power ratio table 130 will incorporate the information for GPU 130 as needed to manage the power and performance of GPU 130, along with any other information that may be needed to determine which GPU to throttle.

In a particular embodiment, when information handling system 100 is operated in the power capping mode, in addition to operating to adjust the performance levels of processor 110 and of GPU 120 in accordance with the power ratio table to apportion performance decreases in accordance with the power ratio for a given task, BMC 150 operates to determine which one of multiple tasks to prioritize for decreasing the performance levels when various tasks are being executed on multiple GPUs. For example, where information handling system 100 is executing "Task 1" on GPU 120 and "Task 2" on GPU 130, then, when the power level of the information handling system needs to be reduced by 15 W, then, based upon power ratio table 160, the BMC can determine to allocate all of the power decrease to "Task 1", can determine that "Task 1" is a high priority task and so allocate all of the power decrease to "Task 2," or can apportion the power decrease between "Task 1" and "Task 2," as needed or desired.

As an example of decreasing the power between "Task 1" and "Task 2," BMC 150 can operate to adjust the performance levels of processor 110, of GPU 120, and of GPU 130 in accordance with an average of the total power levels for all tasks. For example, where information handling system 100 is executing "Task 1" on GPU 120 and "Task 2" on GPU 130, then, when the power level of the information handling system needs to be reduced by 15 W, then, based upon power ratio table 160, the BMC can determine to that the total power consumed is 111 W (75 W for "Task 1" on GPU 120+36 W for "Task 2" on GPU 130), and can allocate the power decrease to "Task 1" on GOU 120 as:

(75/111)×15 W=10.14 W  (Equation 1), and can allocate the power decrease to "Task 2" on GPU 130 as:

(36/111)×15 W=4.86 W  (Equation 2).

In a particular embodiment, power ratio table 160 is preconfigured with the power information for the various tasks, as needed or desired. For example, when a workload is executed on host processing system 102, the workload can include the workload information that provides the power information for that workload. Here, BMC agent 140 can communicate the power information along with the workload information, and BMC 150 can load an entry into power ratio table 160 for the particular workload. In another example, the power information for various common workloads can be pre-installed into power ratio table 160.

In another embodiment, information handling system 100 operates in a performance analysis mode, with power capping turned off. Then, various workloads are instantiated, one at a time, on host processing system 102, and the power levels for processor 110 and GPU 120 are determined and communicated to BMC 150. For each workload, BMC 150 then populates entries in power ratio table 160 with the power level information, determines the total power, and calculates the power ratio. In determining the power levels, power monitors 112 and 122 can provide the power level information for respective processor 110 and GPU 120 to BMC agent 140, and the BMC agent can supply the power information along with the workload information to BMC 150, or the power monitors can provide the power level information directly to the BMC, as needed or desired.

In a particular embodiment, if power ratio table 160 does not include a particular workload entry, then information handling system 100 operates to measure the power levels of processor 110 and of GPU 120 without the particular workload running, and then measures the power levels of the processor and of the GPU with the particular workload running. BMC 150 then uses the difference in the power levels without the workload running and with the workload running, and populates a new entry into power ratio table 160 based upon the differences in the power levels.

Figure 2:
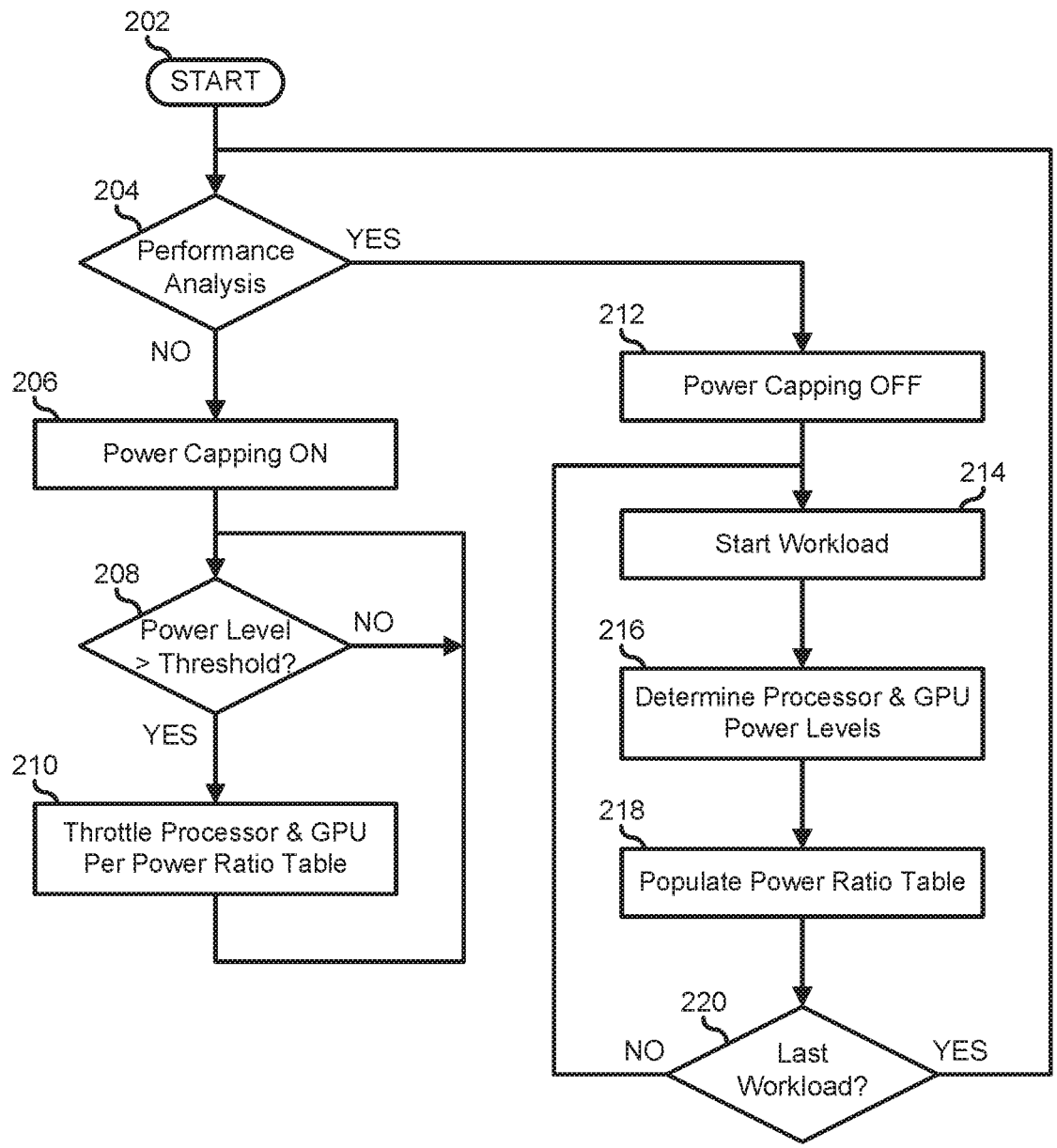
FIG. 2 illustrates a method for optimizing hardware resources for optimal workload performance in an information handling system in accordance with an embodiment of the present disclosure.

FIG. 2 illustrates a method for optimizing hardware resources for optimal workload performance in an information handling system, starting at block 202. A decision is made as to whether or not an information handling system is in a performance analysis mode in decision block 204. If not, the "NO" branch of decision block 204 is taken and power capping for the information handling system is turned on in block 206. A decision is made as to whether or not the power level for the information handling system is greater than a power level threshold in decision block 208. If not, the "NO" branch of decision block 208 is taken and the method returns to decision block 208 until the power level for the information handling system is greater than a power level threshold. When the power level for the information handling system is greater than a power level threshold, the "YES" branch of decision block 208 is taken, the system processor and the GPU are throttled based upon the operating workloads and a power ratio table in block 210, and the method returns to decision block 208.

Returning to decision block 204, if the information handling system is in a performance analysis mode, the "YES" branch of decision block 204 is taken, and power capping for the information handling system is turned off in block 212. A workload is started on the information handling system in block 214. The power levels consumed by the system processor and the GPU are determined in block 216, and the power ratio table is populated based upon the running workload in block 216. A decision is made as to whether or not the operating workload is a last workload to be evaluated in decision block 220. If not, the "NO" branch of decision block 220 is taken, and the method returns to block 214 where a next workload is started on the information handling system. If the operating workload is a last workload to be evaluated, the "YES" branch of decision block 220 is taken and the method returns to decision block 204 where a decision is made as to whether or not an information handling system is in a performance analysis mode.

Figure 3:
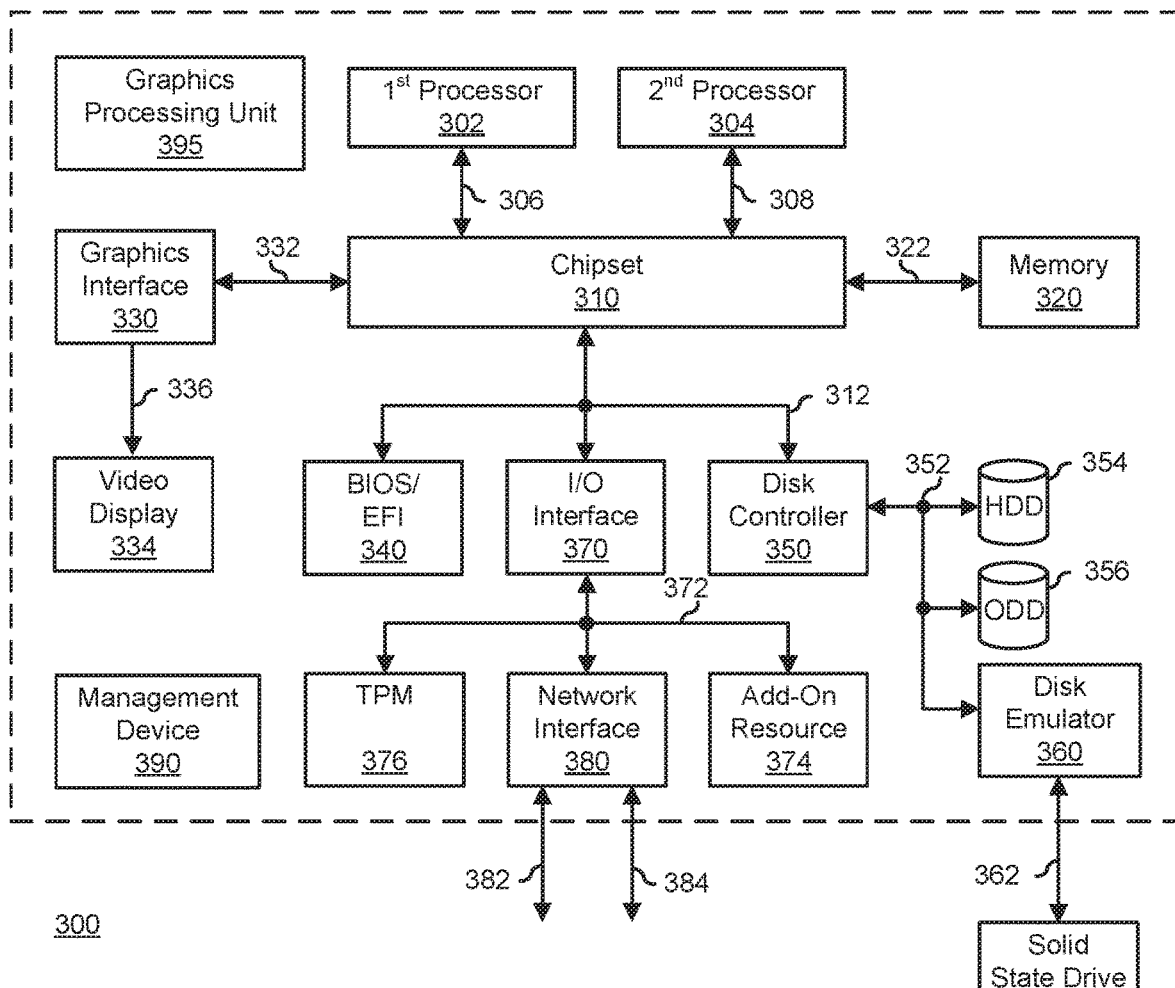
FIG. 3 is a block diagram illustrating an information handling system according to another embodiment of the present disclosure.

FIG. 3 illustrates a generalized embodiment of an information handling system 300 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, a chipset 310, a memory 320, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an input/output (I/O) interface 370, one or more add-on resources 374, a trusted platform module (TPM) 376, a network interface 380, a management device 390, and one or more graphics processing unit (GPU) 395. Processors 302 and 304, chipset 310, memory 320, graphics interface 330, BIOS/UEFI module 340, disk controller 350, HDD 354, ODD 356, disk emulator 360, SSD 362, I/O interface 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired. An example of BMC 160 may.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor configured to instantiate a baseboard management controller (BMC) agent;
    a first graphics processing unit (GPU); and
    a BMC including a power ratio table that provides a plurality of entries, each entry correlating a first particular workload with a first particular power ratio of a power level of the processor when the particular workload is instantiated on the processor and the first GPU to a power level of the first GPU;
    wherein the BMC agent is configured to:
        receive a first power indication from the processor and a second power indication from the GPU; and
        provide the first and second power indications to the BMC; and
    wherein the BMC is configured to:
        determine that the power ratio table includes a first entry associated with a first workload instantiated on the processor and the first GPU;
        determine that a total power level of the information handling system is greater than a power level threshold based upon the first and second power indications; and
        throttle a first power level of the processor and a second power level of the first GPU based upon a first power ratio of the first entry in response to determining that the total power level is greater than the power level threshold.

2. The information handling system of claim 1, wherein the BMC is further configured to:
    set the information handling system into a power capping mode, wherein determining that the power ratio table includes the first entry is in response to setting the information handling system into the power capping mode.

3. The information handling system of claim 2, wherein the BMC is further configured to:
    receive first workload information that identifies the first workload in response to setting the information handling system to the power capping mode.

4. The information handling system of claim 3, wherein determining that the power ratio table includes the first entry is in further response to receiving the first workload information.

5. The information handling system of claim 1, further comprising:
    a second GPU;
    wherein each entry further correlates a second particular workload with a second power ratio of the power level of the processor when the second particular workload is instantiated on the processor and the second GPU to a power level of the second GPU;
    wherein the BMC is further configured to determine that the power ratio table includes a second entry associated with a second workload instantiated on the processor and the second GPU.

6. The information handling system of claim 5, wherein the BMC is further configured to:
    throttle a third power level of the processor and a fourth power level of the second GPU based upon a second power ratio of the second entry in further response to determining that the total power level is greater than the power level threshold.

7. The information handling system of claim 5, wherein each entry of the power ratio table further includes a workload power level of the processor when the particular workload is instantiated on the information handing system, a first workload power level of the first GPU when the particular workload is instantiated on the first GPU, and a second workload power level of the second GPU when the particular workload is instantiated on the second GPU, and wherein the BMC is configured to:
    determine a workload total power level for each entry as a sum of the associated workload power level of the processor and the associated workload power level of the first and second GPUs.

8. The information handling system of claim 7, wherein the BMC is further configured to:
    determine that a first workload total power level of the first entry is greater than a second workload total power level of the second entry, wherein throttling the first power level and the second power level is further based upon determining that the first workload total power level is greater than the second workload total power level.

9. The information handling system of claim 8, wherein the BMC is further configured to throttle the first power level, the second power level, the third power level, and the fourth power level in accordance with an average of the first workload total power level and the second workload total power level.

10. The information handling system of claim 1, wherein each entry of the power ratio table further includes a workload power level of the processor when the particular workload is instantiated on the information handing system, and a workload power level of the first GPU when the particular workload is instantiated on the information handling system, and wherein, prior to determining that the power ratio table includes the first entry, the BMC is further configured to:
    instantiate the first workload on the information handling system;
    determine a first workload power level of the processor and a second workload power level of the first GPU;
    determine the first power ratio based upon the first workload power level and the second workload power level; and populate the first entry with an identifier of the first workload, the first workload power level, the second workload power level, and the first power ratio.

11. A method, comprising:
receiving, by a baseboard management controller (BMC) agent instantiated on a processor of an information handling system, a first power indication from the processor and a second power indication from a graphics processing unit (GPU) of the information handling system;
sending, by the BMC agent, the first and second indications to a BMC of the information handling system;
providing, in a power ratio table included in the BMC, a plurality of entries, each entry correlating a first particular workload with a first power ratio of a power level of a processor of the information handling system when the particular workload is instantiated on the processor and a first graphics processing unit of the information handling system to a power level of the first GPU;
determining, by the BMC, that the power ratio table includes a first entry associated with a first workload instantiated on the information handling system;
determining, by the BMC, that a total power level of the information handling system is greater than a power level threshold based upon the first and second power indications; and
throttling, by the BMC, a first power level of the processor and a second power level of the first GPU based upon a first power ratio of the first entry in response to determining that the total power level is greater than the power level threshold.

12. The method of claim 11, further comprising:
setting, by the BMC, the information handling system into a power capping mode, wherein determining that the power ratio table includes the first entry is in response to setting the information handling system into the power capping mode.

13. The method of claim 12, further comprising:
receiving, by the BMC, first workload information that identifies the first workload in response to setting the information handling system to the power capping mode, wherein determining that the power ratio table includes the first entry is in further response to receiving the first workload information.

14. The method of claim 11, further comprising:
determining, by the BMC, that the power ratio table includes a second entry associated with a second workload instantiated on the information handling system.

15. The information handling system of claim 14, wherein each entry further correlates a second particular workload with a second power ratio of the power level of the processor when the second particular workload is instantiated on the processor and a second GPU of the information handling system to a power level of the second GPU, the method further comprising;
determining, by the BMC, that the power ratio table includes a second entry associated with a second workload instantiated on the processor and the second GPU.

16. The method of claim 15, further comprising:
throttling, by the BMC, a third power level of the processor and a fourth power level of the second GPU based upon a second power ratio of the second entry in further response to determining that the total power level is greater than the power level threshold.

17. The method of claim 15, wherein each entry of the power ratio table further includes a workload power level of the processor when the particular workload is instantiated on the information handing system, a first workload power level of the first GPU when the particular workload is instantiated on the first GPU, and a second workload power level of the second GPU when the particular workload is instantiated on the second GPU, the method further comprising:
determining, by the BMC, a workload total power level for each entry as a sum of the associated workload power level of the processor and the associated workload power level of the first and second GPUs.

18. The method of claim 17, further comprising:
determining, by the BMC, that a first workload total power level of the first entry is greater than a second workload total power level of the second entry, wherein throttling the first power level and the second power level is further based upon determining that the first workload total power level is greater than the second workload total power level.

19. The method of claim 18, further comprising:
throttling, by the BMC, the first power level, the second power level, the third power level, and the fourth power level in accordance with an average of the first workload total power level and the second workload total power level.

20. An information handling system, comprising:
a processor configured to instantiate a baseboard management controller (BMC) agent;
a graphics processing unit (GPU); and
a baseboard management controller (BMC) including a power ratio table that provides a plurality of entries, each entry correlating a particular workload instantiated on the information handling system with a power ratio of a power level of the processor when the particular workload is instantiated on the information handing system to a power level of the GPU when the particular workload is instantiated on the information handling system, wherein each entry includes a workload power level of the processor when the particular workload is instantiated on the information handing system, and a workload power level of the GPU when the particular workload is instantiated on the information handling system;
wherein the BMC agent is configured to:
receive a first power indication from the processor and a second power indication from the GPU; and
provide the first and second power indications to the BMC; and
wherein the BMC is configured to:
turn off power capping on the information handling system;
instantiate a first workload on the information handling system;
determine a first workload power level of the processor and a second workload power level of the GPU;
determine a workload power ratio based upon the first workload power level and the second workload power level;
populate a first entry with an identifier of the first workload, the first workload power level, the second workload power level, and the workload power ratio;
turn on power capping on the information handling system;
receive first workload information that identifies that the first workload is instantiated on the information handling system in response to turning on the power capping mode; and if the total power level is greater than a power level threshold that is based upon the first and second power indications, then throttle a first power level of the processor and a second power level of the GPU based upon the workload power ratio.

\* \* \* \* \*